Oct. 4, 1932. E. W. DAVIS 1,880,853
LUBRICATING APPARATUS
Filed April 22, 1927
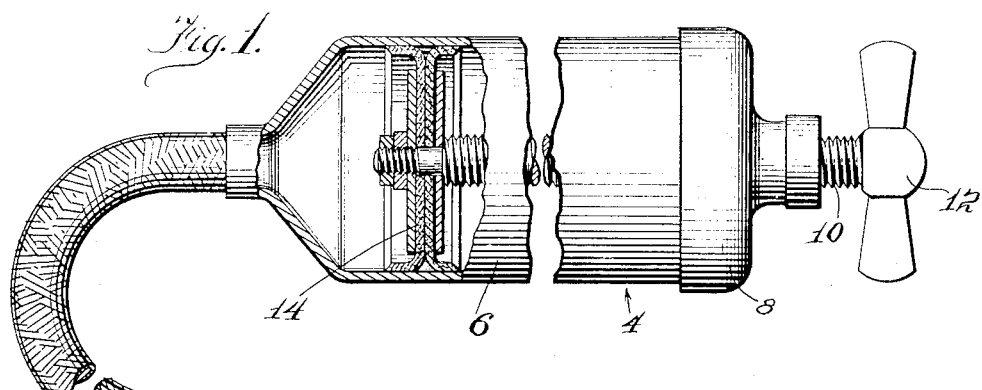
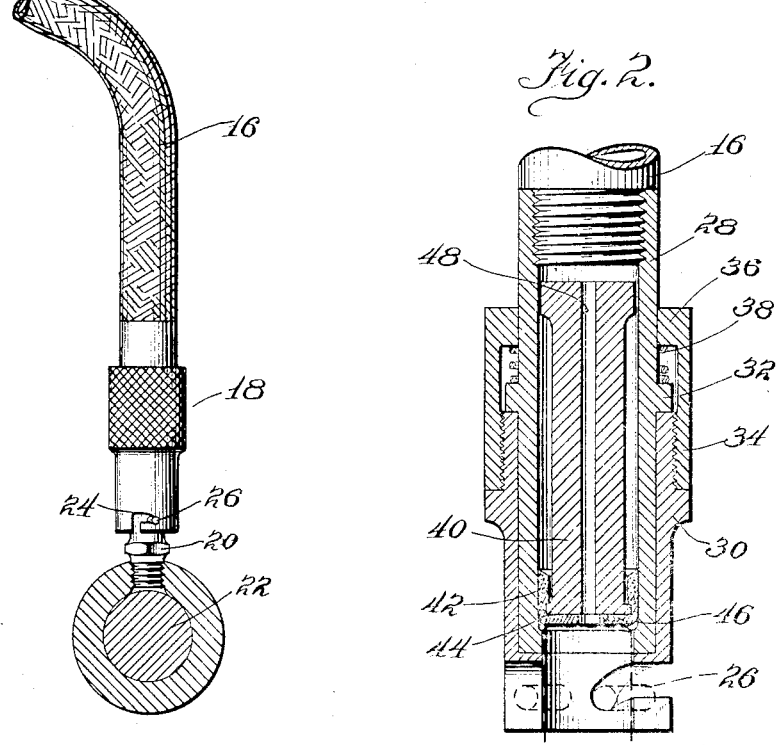
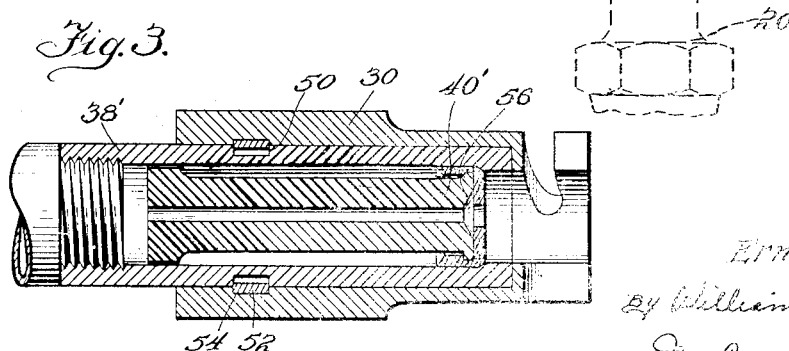

Patented Oct. 4, 1932

1,880,853

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING APPARATUS

Application filed April 22, 1927. Serial No. 185,812.

My invention relates to lubricating apparatus and is especially concerned with improvements in the couplings used in lubricating systems of that type in which the bearings of a machine to be lubricated are each provided with a lubricant receiving member, or nipple, to which the lubricant may be supplied under pressure by a lubricant pump, or compressor, having a discharge conduit provided at its free end with a coupling member adapted to be detachably connected to the nipples.

It is an object of my invention to provide a simplified form of coupling member, usable in a lubricating system of this type, in which the lubricant pressure is utilized to form the initial seal with the lubricant receiving nipple.

A further object is to provide a coupling device which consists of relatively few parts and which may be economically manufactured.

Other objects will appear from the following description, reference being had to the accompanying drawing in which:

Figure 1 is an elevation of the compressor, conduit, coupling, nipple and bearing, a portion of the compressor being broken away more clearly to show the structure;

Figure 2 is a longitudinal sectional view of the coupler; and

Figure 3 is a similar view of a modified form of coupler.

In the system of lubrication in which my invention is employed, lubricant may be supplied to the bearings from a suitable compressor 4 which consists of a barrel 6 having a removable cap 8 through which a stem 10 is threaded. The stem has a handle 12 secured at one end and a cup leather piston 14 secured at the other end. The compressor is connected by a suitable conduit 16 to a coupler by which connection may be made successively to any one of a plurality of lubricant receiving fittings 20 attached to the bearings 22 to be lubricated. In the illustrative embodiment of my invention, the connection of the coupler to the nipple is made through the engagement of a bayonet slot 24 of the coupler with a pin 26 extending transversely through the nipple. The apparatus described is well known in the art and further detailed description thereof is therefore deemed unnecessary.

Referring to Figure 2, the coupler of my invention comprises a cylindrical tube 28 which is shown as threaded to the conduit 16. A sleeve 30 is rotatably and reciprocably mounted at the lower end of the tube 28, its upward movement being limited by an annular projection 32 on the tube 28. A retaining member 34 is threaded to the sleeve 30 and has an inwardly projecting flange portion 36 forming an abutment for a spring 38, the other end of which rests upon the projection 32. The spring is thus confined between the tube 28 and the member 34 and normally holds the sleeve 30 in its upper position in abutment with the projection 32. Reciprocably mounted within the tube 28 is an element 40 which at its lower end carries an apertured cup leather 42 and which is adapted to force the cup leather against the end of the nipple when pressure is applied. The element 40 has a suitable flange 44 to hold the cup leather in place. Downward movement of the element 40 is limited by the engagement of the cup leather 42 with a rounded shoulder 46 formed in the bore of the tube 28. The element 40 has a long axial bore 48 through which the lubricant is forced in its passage from the compressor to the nipple. This passage is relatively long and constricted and will offer sufficient resistance to flow of the lubricant so that after connection to the nipple has been effected and the pressure applied, the element 40 will be forced downwardly to bring the cup leather 42 in sealing engagement with the end of the nipple before any of the lubricant will be forced through the bore 48. Upon relieving the pressure in the compressor by turning backward on the handle 12, the element 40 with the cup leather 42 will be "sucked" upwardly before the lubricant will be drawn back through the bore 48.

The sleve 30 is slidably mounted so as to take up any irregularities in the length of the nipples and facilitate the coupling operation.

The provision of this spring is, however, not essential to the effective operation of the coupler and I have therefore shown a modified and greatly simplified structure in Figure 3 in which this element has been omitted.

In the modification the tube 38' has a suitable annular groove or recess 50 which is adapted to receive a split resilient ring 52. The sleeve 30' has a corresponding annular recess 54 which is approximately half as deep as the recess or groove 50, so that the sleeve 30 may be slid over the ring 52 and permit the ring to expand when the recesses 50 and 54 are in registry, thereby securely and permanently locking the sleeve 30 over the tube 38'. In other respects the coupling shown in Figure 3 is similar in structure and operation to that shown in Figure 2 except that the end of the element 40' adjacent the cup leather is hollowed out as indicated at 56 to permit the lubricant to press against the face of the cup leather to force it into sealing engagement with the end of the nipple.

While I have shown and described particular embodiments of my invention, it will be apparent to those skilled in the art that modifications thereof may be made without departing from the principles of my invention. I therefore wish to limit the scope of my invention only by the claims which follow.

I claim:

1. Lubricating apparatus comprising a lubricant receiving fitting, a tube connected to a source of lubricant the pressure of which may be varied to be greater or less than atmospheric pressure, a coupling sleeve carried thereby and adapted for quick detachable connection to said fitting, an element reciprocable freely in both directions within said tube and having means for making a sealed connection with the walls of said tube and the end of said fitting, said element having a long constricted passageway and flat end surface offering high resistance to the flow of lubricant whereby when lubricant pressure is applied said element will move longitudinally from its normal position to bring said member in sealing engagement with the end of said fitting before the lubricant flows through said passage-way and when the pressure in the tube is less than atmospheric said element will be returned to normal position and withdraw said member from engagement with the ends of said fitting.

2. In a system of the class described, the combination of a tube adapted to be connected to a source of grease under pressure, a coupling sleeve rotatably mounted on said tube and adapted to make a quick detachable connection with a grease receiving fitting, an unbiased reciprocable element having a passage-way offering high frictional resistance to the flow of grease through said tube, and means carried by said element for forming a sealed connection between the walls of said tube and the fitting whereby said seal will be formed prior to the passage of grease to said fitting.

3. A device for making a quick detachable connection between a source of lubricant under pressure and a fitting adapted to receive the lubricant, comprising a tubular member, a sleeve having means for making a quick detachable connection with the fitting swiveled on said tubular member, and an unbiased element slidable in said tubular member and having a relatively small and long passage-way extending therethrough, and a cup leather carried by said element and adapted to form a seal between the walls of said tubular member and a fitting, said element being adapted to force said cup leather against the end of said fitting prior to the flow of lubricant through said passage-way.

4. A device for making a quick detachable connection between a source of lubricant under pressure and a fitting adapted to receive the lubricant, comprising a member connected to a source of lubricant under pressure, a sleeve having means for making a quick detachable connection with a lubricant receiving fitting, a split ring confined in registering grooves in said member and said sleeve, and means reciprocable freely in both directions within said member adapted to form a seal between said member and a portion of a lubricant receiving fitting, said means having a sufficiently high frictional resistance to the flow of lubricant so as to be reciprocated upon flow of lubricant into and out of said member.

In witness whereof, I hereunto subscribe my name this 14th day of April, 1927.

ERNEST W. DAVIS.